United States Patent [19]

Blake et al.

[11] Patent Number: 5,052,127

[45] Date of Patent: Oct. 1, 1991

[54] DRYER BAG

[76] Inventors: Charles Blake, 660 Arrow Ave. Apt. 11G, Bronx, N.Y. 10467; George Spector, 233 Broadway, New York, N.Y. 10007

[21] Appl. No.: 586,293

[22] Filed: Sep. 21, 1990

[51] Int. Cl.[5] .......................... F26B 19/00; B01D 46/02

[52] U.S. Cl. ............................................ 34/82; 34/85; 34/88; 34/90; 34/86; 55/361

[58] Field of Search .................. 34/82, 85, 86, 90, 235; 55/361, 364, 378, 370, 371, 380

[56] References Cited

U.S. PATENT DOCUMENTS

| | | | |
|---|---|---|---|
| 1,504,136 | 8/1924 | Patterson et al. | 55/364 |
| 4,106,213 | 8/1978 | Witte | 34/82 X |
| 4,121,351 | 10/1978 | Kapke | 34/86 |
| 4,122,612 | 10/1978 | Mrofchak | 34/86 |
| 4,156,973 | 6/1979 | Bede | 34/86 |

FOREIGN PATENT DOCUMENTS

| | | | |
|---|---|---|---|
| 2702270 | 10/1978 | Fed. Rep. of Germany | 34/82 |
| 0766086 | 1/1957 | United Kingdom | 55/364 |

*Primary Examiner*—Henry A. Bennet
*Assistant Examiner*—Christopher B. Kilner

[57] ABSTRACT

A vent bag for a clothes dryer is provided and consists of a pouch with an air filter at its distal end that is releasably secured on a vent pipe of the clothes dryer so that the air filter can catch lint coming out of the vent pipe and recirculate the warm moist exhausted air from the vent pipe for energy conservation.

3 Claims, 1 Drawing Sheet

DRYER BAG

BACKGROUND OF THE INVENTION

The instant invention relates generally to clothes dryer exhaust vents and more specifically it relates to a vent bag for a clothes dryer which provides an air filter for catching lint coming out of the vent pipe of the clothes dryer.

There are available various conventional clothes dryers which do not provide the novel improvements of the invention herein disclosed.

SUMMARY OF THE INVENTION

A primary object of the present invention is to provide a vent bag for a clothes dryer that will overcome the shortcomings of the prior art devices.

Another object is to provide a vent bag for a clothes dryer that is installed on the vent pipe of the clothes dryer to catch lint coming out of the clothes dryer for recirculating the warm moist exhausted air for energy conservation.

An additional object is to provide a vent bag for a clothes dryer that has a replaceable air filter pouch within a non-porous outer pouch so that the outer pouch can be retained and used again when the air filter pouch has to be replaced.

A further object is to provide a vent bag for a clothes dryer that is simple and easy to use.

A still further object is to provide a vent bag for a clothes dryer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
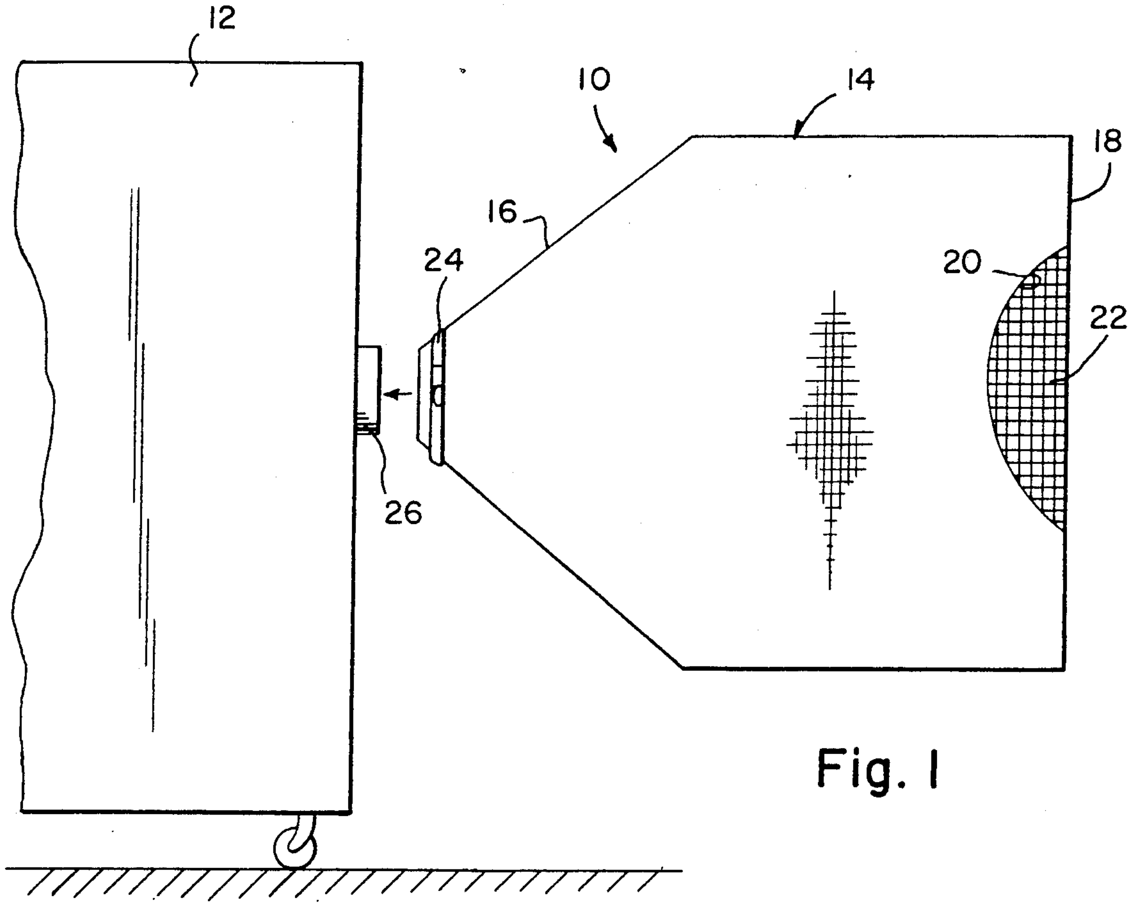
FIG. 1 is a elevational view of the invention ready to be installed on a clothes dryer vent pipe.

Turning now descriptively to the drawings, in which similar reference characters denote similar elements throughout the several views, FIG. 1 illustrates a vent bag 10 for a clothes dryer 12, consisting of a flexible pouch 14 of cloth material, having a tapered open end 16 and a wide substantially closed end 18 with an aperture 20 therethrough. An air filter 22 covers the aperture 20 at the wide substantially closed end 18 of the flexible pouch 14. An adjustable clamp band member 24 fits about the tapered open end 16 of the flexible pouch 14 on the vent pipe 26 of the clothes dryer 12. The adjustable clamp band member 24 releasably secures the tapered open end 16 of the flexible pouch 14 on the vent pipe 26 so that the air filter 22 can catch lint coming out of the vent pipe 26 and recirculate the warm moist exhausted air from the vent pipe for energy conservation.

Figure 2:
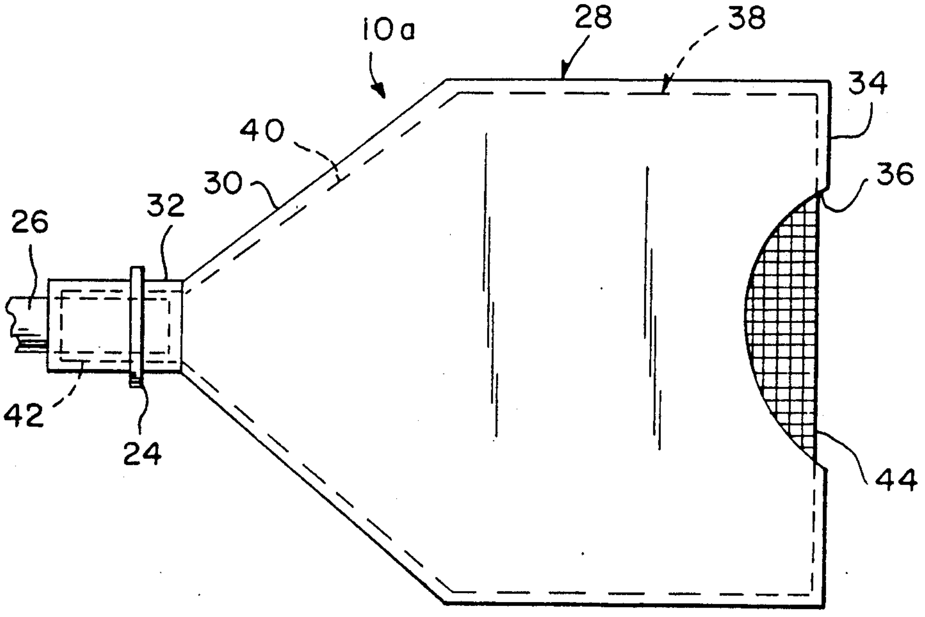
FIG. 2 is an elevational view of a modification in which a porous inner pouch acting as an air filter with a stiff flexible inner sleeve is inserted within a non-porous outer pouch and installed on the vent pipe of the clothes dryer.

FIG. 2 shows another type of vent bag 10*a* for the clothes dryer 12 consisting of a non-porous reusable outer pouch 28 having a tapered end 30 with a sleeve 32 and a wide substantially closed end 34 with an aperture 36 therethrough. A porous replaceable inner pouch 38 has a tapered end 40 with a stiff and flexible sleeve 44 and a wide closed end 44 sized to be inserted within the outer pouch 28 through the aperture 36 so that part of the wide closed end 44 of the inner pouch 38 will cover the aperture 36 in the outer pouch 28 to act as an air filter. The clamp band member 24 fits about the sleeves 32 and 34 on the vent pipe 26 of the clothes dryer 12, so that the inner pouch 38 can catch the lint coming out of the vent pipe 26 and also recirculate th warm moist exhausted air from the vent pipe 26 for energy conservation.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A vent bag for a clothes dryer comprising:
   a) a reusable outer pouch having a tapered front end with an outer sleeve and a wider rear end with an aperture therethrough;
   b) a porous replaceable inner pouch having a tapered front end with a forward extending inner sleeve and a wider rear end, said inner pouch sized to be inserted through said aperture of said outer pouch whereby said rear end of said inner pouch will cover said aperture of said outer pouch to act as an air filter and wherein said outer sleeve encompasses said inner sleeve;
   c) means for releasably securing said sleeves on a vent pipe of the clothes dryer so that said inner pouch can catch lint coming out of the vent pipe and recirculate the warm moist filtered exhausted air from the vent pipe for energy conservation.

2. A vent bag as recited in claim 1, wherein said securing means includes an adjustable clamp band member to fit about the sleeves of the vent pipe of the clothes dryer.

3. A vent bag as recited in claim 2, wherein said inner sleeve is stiff and flexible and wherein said outer pouch is non-porous whereby all the filtered air is exhausted through said aperture.

* * * * *